(12) United States Patent
Sharp

(10) Patent No.: US 9,742,161 B2
(45) Date of Patent: Aug. 22, 2017

(54) SNAP ON FINGERSAFE SYSTEM FOR PANELBOARDS

(71) Applicant: SCHNEIDER ELECTRIC USA, INC., Palatine, IL (US)

(72) Inventor: Jeffrey Owen Sharp, Murfreesboro, TN (US)

(73) Assignee: Schneider Electric USA, Inc., Andover, MA (US)

( * ) Notice: Subject to any disclaimer, the term of this patent is extended or adjusted under 35 U.S.C. 154(b) by 186 days.

(21) Appl. No.: 14/837,230

(22) Filed: Aug. 27, 2015

(65) Prior Publication Data
US 2017/0063051 A1     Mar. 2, 2017

(51) Int. Cl.
*H02B 1/14* (2006.01)
*H02B 1/20* (2006.01)
*H02B 1/04* (2006.01)

(52) U.S. Cl.
CPC ............. *H02B 1/14* (2013.01); *H02B 1/04* (2013.01); *H02B 1/20* (2013.01)

(58) Field of Classification Search
None
See application file for complete search history.

(56) References Cited

U.S. PATENT DOCUMENTS

| | | | | |
|---|---|---|---|---|
| 4,029,896 A * | 6/1977 | Skinner | ............... | F24C 15/104 174/138 F |
| 4,667,269 A * | 5/1987 | Morby | ............... | H02B 1/056 174/92 |
| 5,113,312 A * | 5/1992 | Pratt | ............... | H02B 1/14 361/611 |
| 5,134,543 A * | 7/1992 | Sharp | ............... | H02B 1/40 361/644 |
| 5,272,592 A * | 12/1993 | Harris | ............... | H02B 1/056 361/637 |
| 5,761,026 A * | 6/1998 | Robinson | ............... | H02B 1/056 200/303 |
| 5,786,982 A * | 7/1998 | Rose | ............... | H02B 1/056 174/149 B |
| 6,472,605 B1 * | 10/2002 | Griffith | ............... | H02B 1/056 174/101 |
| 7,580,247 B1 * | 8/2009 | Pearson | ............... | H02B 1/056 174/149 B |
| 8,547,684 B2 * | 10/2013 | Diaz | ............... | H02B 1/056 361/624 |
| 9,338,866 B1 * | 5/2016 | Faber | ............... | H01H 71/082 |
| 9,548,548 B2 * | 1/2017 | Potratz | ............... | H01R 9/2458 |
| 2016/0247651 A1 * | 8/2016 | O'Brien | ............... | H01H 19/04 |

* cited by examiner

*Primary Examiner* — Courtney Smith
(74) *Attorney, Agent, or Firm* — Locke Lord LLP

(57) ABSTRACT

A touch safe system is provided for an electrical panel, such as a panel board or residential load center. The system includes a phase barrier to isolate branch connectors along a center portion of the electrical panel, a top central cover that snaps onto the phase barrier and two side bus covers. The side bus covers are arranged along opposite sides of the phase barrier over opposite side portions of the electrical panel. The system further includes snap-in filler plates to cover any exposed portion of a branch connector which is unoccupied by a circuit breaker. Each of the snap-in filler plates is secured between the top center bus cover and one of the side bus covers. A snap-in lug cover can also be provided for each circuit breaker on the panel, and secured between one of the side bus covers and a recessed portion of the circuit breaker.

15 Claims, 11 Drawing Sheets

SNAP ON FINGERSAFE SYSTEM FOR PANELBOARDS

FIELD

The present disclosure relates to the field of electrical panels such as a panel board or residential load center, and more particularly, to a touch safe system for electrical panels.

BACKGROUND

An electrical panel, such as a panelboard or residential load center, includes a main bus system with a plurality of buses (e.g., bus bars) to distribute power from a single or multi-phase power source to downstream branch circuits. Each bus can have multiple branch connectors. The electrical panel can employ electrical devices such as circuit breakers, which provide overcurrent protection in the distribution of power to the branch circuits. The circuit breakers have a terminal, such as a plug-on or bolt-on terminal, which is connectable to one of the branch connectors on the electrical panel. The electrical panel is typically housed in an electrical enclosure to protect a person from coming in direct contact with live conductors, which is a hazardous situation. It is recommended that power be shut off to the main bus system as a precaution before accessing the electrical panel and the electrical devices connected thereto.

A person, such as an electrician, may have a legitimate reason for accessing the electrical panel when still energized, e.g., without turning off the power to the main bus system. These reasons can, for example, include troubleshooting, such as to perform voltage measurements or thermal scanning for hot spots on the electrical panel. There may be other legitimate reasons to access an energized electrical panel if there is a greater hazard associated with turning off power to the main bus system of the electrical panel. For example, the electrical panel is kept energized to prevent the turning off of an exhaust fan which evacuates hazardous gases. Therefore, an electrical panel, which is IP2X compliant or "finger safe" (hereinafter "IP2X electrical panel") can be used to reduce the risk of accidental human contact with energized components or of arc flash between energized conductors. The IP2X test is identified in the International Electrotechnical Commission (IEC) Standard 60529, which addresses the level of ingress protection. The IP2X test simulates the effects of a person probing with their finger.

SUMMARY

A touch safe system is provided for an electrical panel, such as a panelboard or residential load center, with a bus system that includes buses with branch connectors to distribute power to downstream branch circuits. The touch safe system is configured to satisfy IP2X requirements by preventing an object having a diameter of 12 mm from contacting energized components on the electrical panel.

The touch safe system includes a phase barrier, first and second side bus covers and a top center cover. The phase barrier is arranged over and along a center portion of the electrical panel, and includes a plurality of spaced-apart projections to isolate the branch connectors from each other. Each pair of adjacent projections can define a row on the electrical panel. Two circuit breakers can be electrically connected along each row to a branch connector(s) arranged between an associated pair of adjacent projections from opposite side portions of the electrical panel, such as a left side and a right side of the electrical panel. The first and second side bus covers are arranged on opposite sides of the phase barrier over and along opposite side portions of the electrical panel. Each of the first and second side bus covers includes a plurality of spaced-apart first slots and a rail along which to physically secure a circuit breaker with a terminal electrically connectable to one of the branch connectors. Each first slot is associated with a pair of adjacent projections with one of the branch connectors therebetween. The top center cover is arranged over the phase barrier along a center portion of the electrical panel, and is connectable to the projections of the phase barrier, using a snap-fit assembly. The touch safe system further includes snap-in filler plates, each of which is used to cover an exposed portion of a branch connector which is unoccupied by a circuit breaker. Each of the snap-in filler plates includes a first end with a tab to interlock with the top center cover, and an opposite second end with a snap-fit to engage one of the first slots of the side bus covers. Accordingly, each unoccupied branch connector (or portion thereof) on the electrical panel is coverable with one of the snap-in filler plates.

The touch safe system can also include lug covers for circuit breakers electrically connected to the branch connectors on the electrical panel. Each of the first and second side bus covers can further include a second slot for each pair of adjacent projections with one of the branch connectors therebetween. Each lug cover includes a first end and an opposite second end. To secure a lug cover over a wire terminal (e.g., lug) of a circuit breaker, the first end of the lug cover is engaged to one of the second slots on a first or second side bus cover. The second end of the lug cover is then engaged to (e.g., snapped into) a top portion of the circuit breaker.

The touch safe system of the present disclosure allows both a standard non-IP2X electrical panel and an IP2X electrical panel to be manufactured on the same assembly line. For example, on the assembly line, a non-IP2X electrical panel can be upgraded to an IP2X electrical panel simply with the addition of a few extra parts, such as for example the top center cover, the snap-in filler plates and the lug covers. These extra parts can incorporate a snap-fit assembly to facilitate ease of assembly of the components of the touch safe system onto an electrical panel. Furthermore, the touch safe system of the present disclosure can be used to convert an existing non-IP2X standard electrical panel to an IP2X electrical panel in the field depending on customer requirements.

BRIEF DESCRIPTION OF THE DRAWINGS

The description of the various exemplary embodiments is explained in conjunction with the appended drawings, in which.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
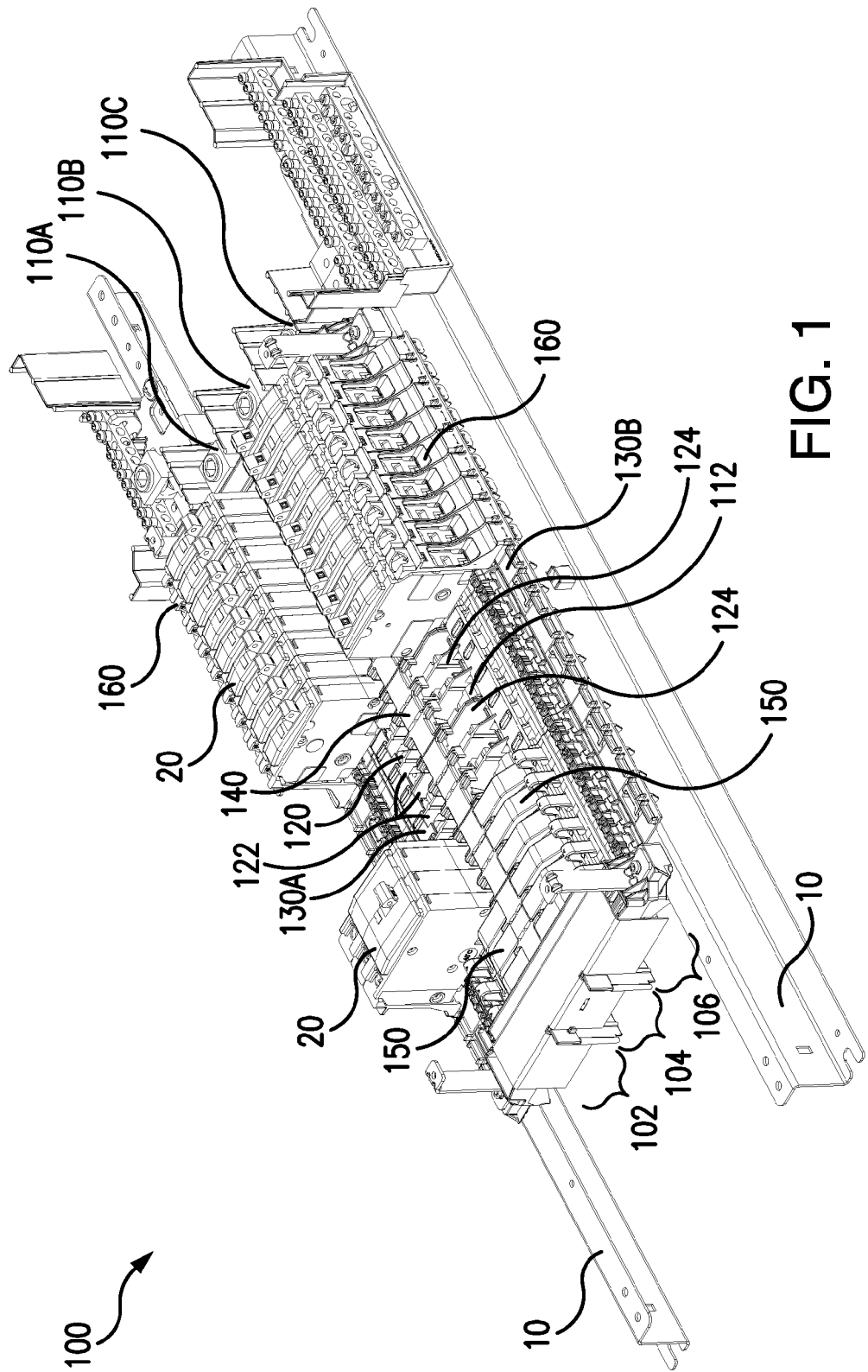
FIG. 1 illustrates an overall view of an example electrical panel with a touch safe system having a center bus cover with a phase barrier, two side bus covers on opposite sides of the phase barrier, a top center cover, a plurality of snap-in filler plates to cover branch connectors unoccupied by a circuit breaker, and a plurality of lug covers for the circuit breakers on the electrical panel.

Referring to FIG. 1, an overall perspective view is shown of an electrical panel 100, such as a panel board or residential load center, which is mounted to a frame 10. The electrical panel 100 has installed thereon a bus system to distribute power from a single or multi-phase power source (not shown) to a plurality of downstream branch circuits. In this example, the bus system can be a conventional three-phase system with a first bus 110A (Phase "A"), a second bus 110B (Phase "B") and a third bus 110C (Phase "C"). Each of the buses 110A, 110B and 110C can include a conductive bus bar (not shown), which extends along a first side portion 102 (e.g., a left side), a center portion 104 and a second side portion 106 (e.g., a right side), respectively, of the electrical panel 100.

Each of the buses 110A, 110B and 110C has multiple conductive branch connectors 112 connected thereto. The branch connectors 112 are arranged along the center portion 104 of the electrical panel 100, and are configured to receive a terminal from at least one circuit breaker 20. The electrical panel 100 includes an insulated center bus cover 120 formed of a dielectric material. The center bus cover 120 is arranged over and along the center portion 104 of the electrical panel 100 to cover energized components of the bus system thereunder, e.g., the bus bar of the second bus 110B (Phase B). The center bus cover 120 has a phase barrier 122 that includes a plurality of insulated spaced-apart projections 124, which are substantially parallel to one another. In this example, each pair of adjacent projections 124 isolates a branch connector(s) 112 arranged therebetween from other branch connectors 112 (between other pairs of adjacent projections 124), and defines a row along which terminals of two circuit breakers 20 can engage the branch connector(s) 112. Thus, as shown in FIG. 1, the electrical panel 100 has a plurality of rows in which two circuit breakers 20 can engage a branch connector(s) 112 on each row from opposite side portions 102 and 106 of the electrical panel 100. The circuit breaker 20 can be a plug-on circuit breaker with a plug-on terminal (e.g., a clip or jaw connector) or a bolt-on circuit breaker with a bolt-on terminal (e.g., a bolt-on connector).

The electrical panel 100 further includes an insulated first side bus cover 130A, an insulated second side bus cover 130B and an insulated top center cover 140, each of which can be formed of a dielectric material. The first side bus cover 130A is arranged over and along the first side portion 102 of the electrical panel 100 to cover energized components of the bus system thereunder, e.g., the bus bar of the first bus 110A (Phase A). Similarly, the second side bus cover 130B is arranged over and along the second side portion 106 of the electrical panel 100 to cover energized components of the bus system thereunder, e.g., the bus bar of the third bus 110C (Phase C). The first and second side bus covers 130A and 130B are fastened to or arranged on opposite sides of the phase barrier 112. The top center cover 140 is connected to the phase barrier 122, and extends over the center portion 104 of the electrical panel 100. Each one of the first side bus cover 130A, the second side bus cover 130B and the top center cover 140 can be formed as a unitary component (e.g., a single piece), or from multiple components such as sections which are assembled together or arranged back-to-back (or adjacent to one another) on the electrical panel 100.

As further shown in FIG. 1, each branch circuit(s) 112 between a pair of adjacent projections 124 of the phase barrier 122 is partially exposed when unoccupied by a circuit breaker 20 from the first side portion 102 and/or the second side portion 106 of the electrical panel 100. As an added precaution, the electrical panel 100 can include one or more insulated snap-in filler plates 150 formed of a dielectric material. The snap-in filler plate 150 is used to cover an exposed portion of an unoccupied branch connector 112, and thus, prevents direct user contact thereof. For example, a snap-in filler plate 150 is configured to snap onto the electrical panel 100 between one of the side bus covers 130A or 130B and the top center cover 140 if unoccupied by a circuit breaker 20. In FIG. 1, the electrical panel 100 is shown with some rows with their branch connector(s) 112 neither occupied by a circuit breaker 20 nor a snap-in filler plate 150 for explanatory purposes. However, in practice, the electrical panel 100, if energized, would have the branch connector(s) 112 in every row occupied, and thus covered, by either a circuit breaker 20 or a snap-in filler plate to prevent direct user contact of any of the branch connectors 112 or energized components around the center portion of the electrical panel 100.

When the electrical panel 100 has circuit breakers 20 connected to the branch connectors 112, the wire terminals (e.g., lugs) on the circuit breakers 20 may be exposed or inadequately covered. To prevent direct user contact of the wire terminals of the circuit breakers 20, the electrical panel 100 can further include an insulated lug cover 160 for each circuit breaker 20 connected on the electrical panel 100. The lug cover 160 is connected over a wire terminal of a circuit breaker 20 between one of the side bus covers 130A or 130B and a portion of the circuit breaker 20 (e.g., a portion above the wire terminal). The lug cover 160 can be formed of a dielectric material, and designed as a snap-in assembly.

Accordingly, the electrical panel 100 of the present disclosure can incorporate a touch safe system, which includes the center bus cover 120 with the phase barrier 122, the side bus covers 130A and 130B (generally referred to as side bus covers "130"), the top center cover 140, the snap-in filler plates 150 and the lug covers 160. When assembled onto the electrical panel 100, the components of the touch safe system can convert a standard non-IP2X electrical panel into an IP2X electrical panel, i.e., one which prevents an object having a diameter greater than 12 mm from coming into contact with energized components on the electrical panel 100. Each of the components of the touch safe system of the electrical panel 100 can be designed with a snap-on assembly (e.g., cantilever snap-fit or torsional snap-fit) to facilitate ease of assembly.

Figure 2:
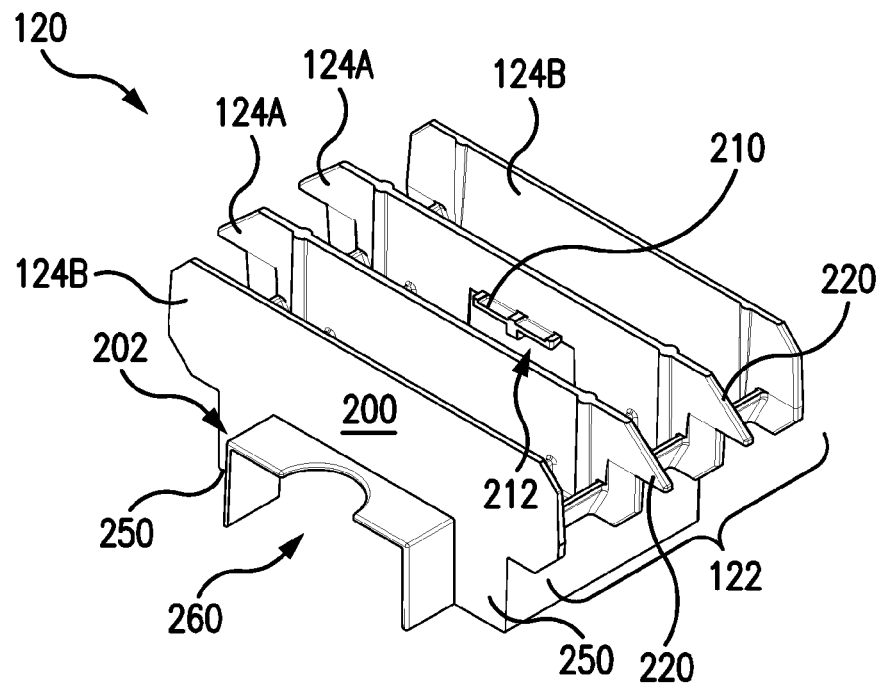
FIG. 2 illustrates a top perspective view of a section of the center bus cover of FIG. 1, with a phase barrier having a plurality of spaced-apart projections for isolating a branch connector(s) from other branch connectors and a recessed area(s) to facilitate snap-on connectivity of the top center cover to the center bus cover.

FIG. 2 illustrates a top perspective view of a center bus cover section 200 of the center bus cover 120 of FIG. 1. A plurality of the center bus cover sections 200 can be arranged back-to-back over and along the center portion 104 of the electrical panel 100 (such as in FIG. 1) to cover energized components of the bus system thereunder, e.g., the bus bar of the second bus 110B (Phase B). As shown in FIG. 2, each center bus cover section 200 can include a base cover 202 and a section of the phase barrier 122. The base cover 202 includes a channel 260 defined by walls 250 to cover energized components of the bus system thereunder (e.g., the bus bar of the second bus 110B (Phase B)), and to isolate the energized components from other energized components of the bus system (e.g., the bus bar of the other buses 110A (Phase A) and 110C (Phase C)).

The phase barrier 122 includes a plurality of projections 124A and 124B (sometimes referred together as "projections 124" herein). In this example, the section of the phase barrier 122 includes four spaced-apart, substantially parallel projections 124, which provide for three different pairs of adjacent projections 124. Two of the middle projections 124A have an extension 220 at each end, so the projections 124A extend farther outwards from opposing sides of the phase barrier 122 in comparison to the other two projections 124B. As shown in the side view of the central bus cover section 200 in FIG. 3, the phase barrier 122 further includes a ridge 210 on adjacent surfaces of each of the projections 124B, which provide a recessed area 212 thereunder to receive a snap-fit (e.g., an overhang of a snap-fit) such as from the top center cover 140 (e.g., shown in FIG. 1). The recessed area 212 can be designed in other ways on the projections 124A, so long as they do not interfere with the engagement of a terminal of a circuit breaker 20 onto one of the branch connectors 112. Although the base cover 202 and the phase barrier 122 are formed together as part of each center bus cover section 200 in the example of FIGS. 2 and 3, they can be formed as separate components.

Figure 4:
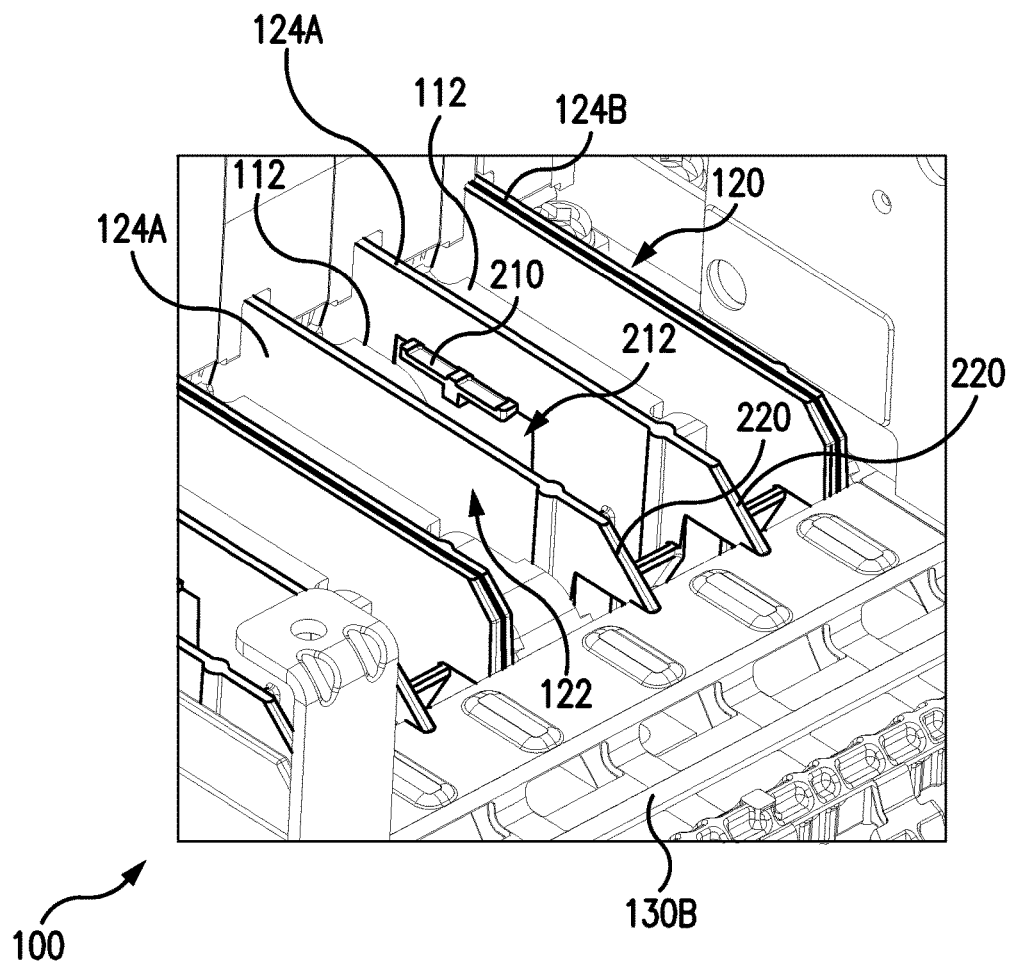
FIG. 4 illustrates a top perspective view of a portion of the electrical panel of FIG. 1, with the top center cover removed to show a plurality of branch connectors isolated from other by the projections of the phase barrier of the center bus cover.

FIG. 4 illustrates a top perspective view of an enlarged portion of the electrical panel 100 of FIG. 1, in which the top center cover 140 has been removed to show branch connectors 112 being isolated from other branch connectors 112 by the projections 124 of the phase barrier 122. In this example, the electrical panel 100 can have the branch connector(s) 112 of the different phases alternate row-by-row, e.g., Phase A, Phase B, Phase C, Phase A, etc. Furthermore, as shown in FIG. 4, an edge of one side of the second side bus cover 130B is arranged under a portion of the phase barrier 122, particularly the extensions 220 of the projections 124A.

Figure 5:
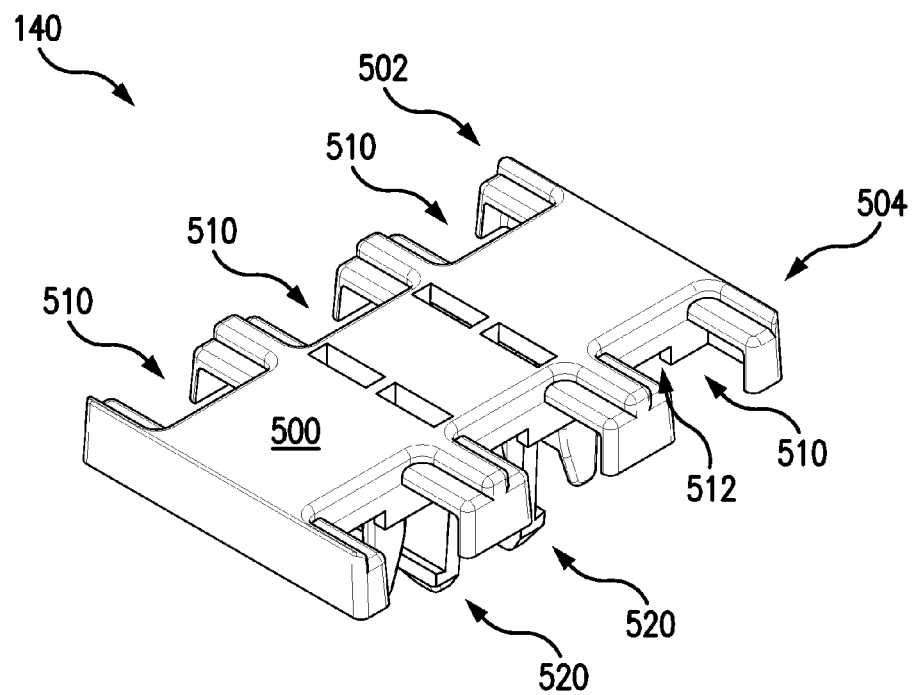
FIG. 5 illustrates a top perspective view of a section of the top center cover of FIG. 1, with a plurality of access openings and a snap-fit to connect the top center cover to the phase barrier of the center bus cover.

FIG. 5 illustrates a top perspective view of a top center cover section 500 of the top center cover 140 of FIG. 1. A plurality of top center cover sections 500 can be arranged back-to-back over and along the center portion 104 of the electrical panel 100 (such as in FIG. 1) to cover a portion of the branch connectors 112 arranged in adjacent spaced-apart projections 124 of the phase barrier 122. As shown in FIG. 5, the top center cover section 500 includes a plurality of spaced-apart access openings 510 along opposing first side 502 and second side 504. In this example, the access openings 510 are notches, which are spaced-apart and formed on edges along each of the sides 502 and 504; however, the access openings 510 can have a different size and shape that is finger safe, e.g., to prevent access from an object having a diameter greater than 12 mm.

Figure 3:
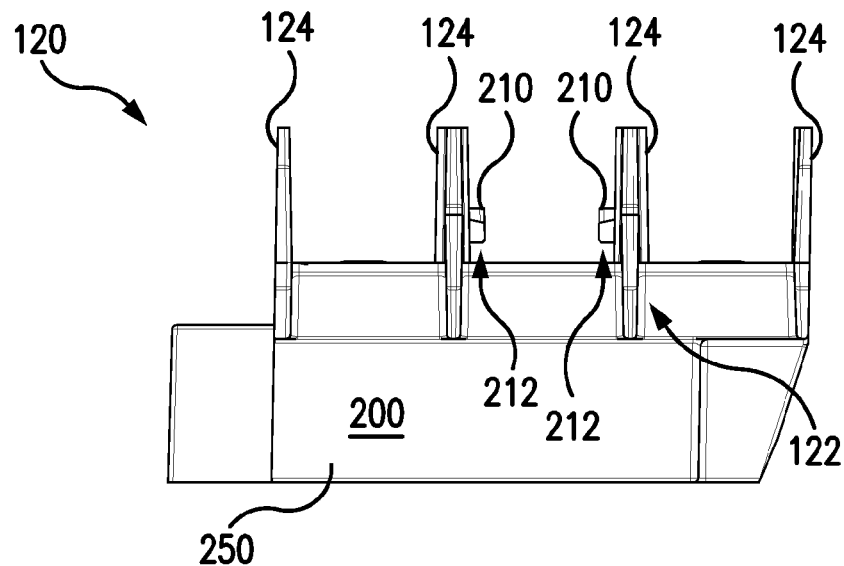
FIG. 3 illustrates a side top perspective view of a section of the center bus cover of FIG. 2.

The top center cover section 500 also includes a snap-fit 520 to connect the top center cover 140 to the phase barrier 122 of the center bus cover 120 (see e.g., FIGS. 2-4). As shown in the side view of FIG. 6, the snap-fit 520 includes a plurality of cantilevered legs each with an overhang (e.g., a hook) at a free end thereof. The snap-fit 520 is configured to snap into the recessed area 212 on the projections 124A (as shown in FIGS. 2-4) when connecting the top center cover 140 onto the phase barrier 122.

Figure 6:
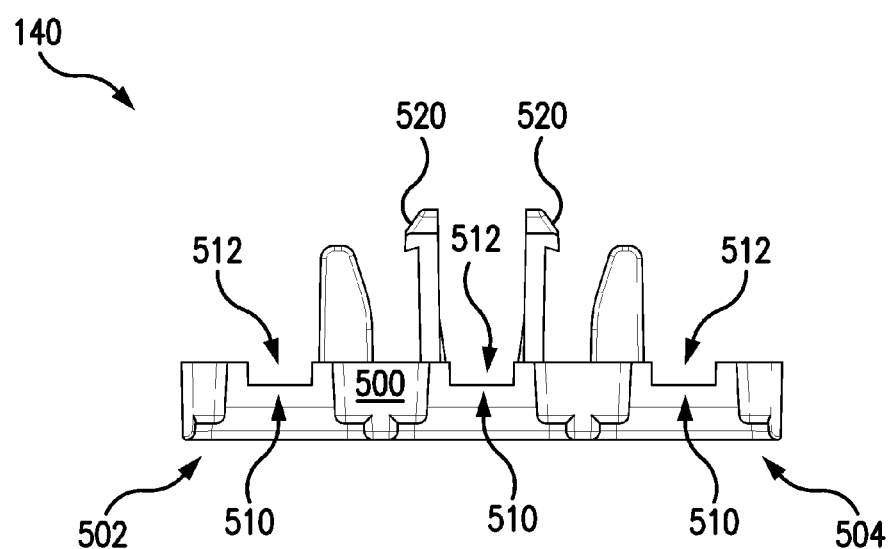
FIG. 6 illustrates a side view of the section of the top center cover of FIG. 5.

Furthermore, as shown in FIGS. 5 and 6, the top center cover section 500 includes a plurality of spaced-apart tab recesses 512 positioned along the first side 502 and the second side 504. Each tab recess 512 is configured to receive a tab on a snap-in filler plate 150 (in FIG. 1) when connecting the snap-in filler plate 150 onto the electrical panel 100. Examples of the snap-in filler plate 150 are discussed below in further detail with reference to FIGS. 10-13.

Figure 7:
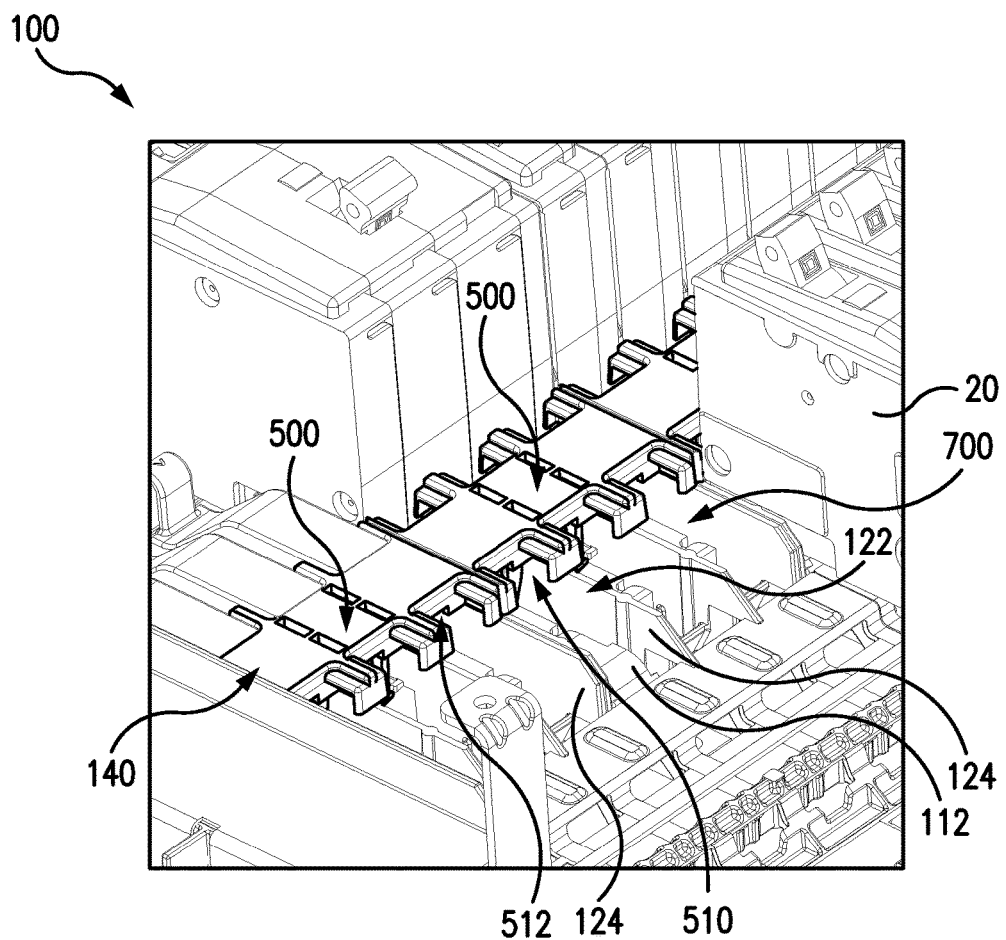
FIG. 7 illustrates a top perspective view of a portion of the electrical panel of FIG. 1, with the top center cover connected to the phase barrier of the center bus cover along a center portion of the electrical panel and over the projections of the phase barrier.
Figure 8:
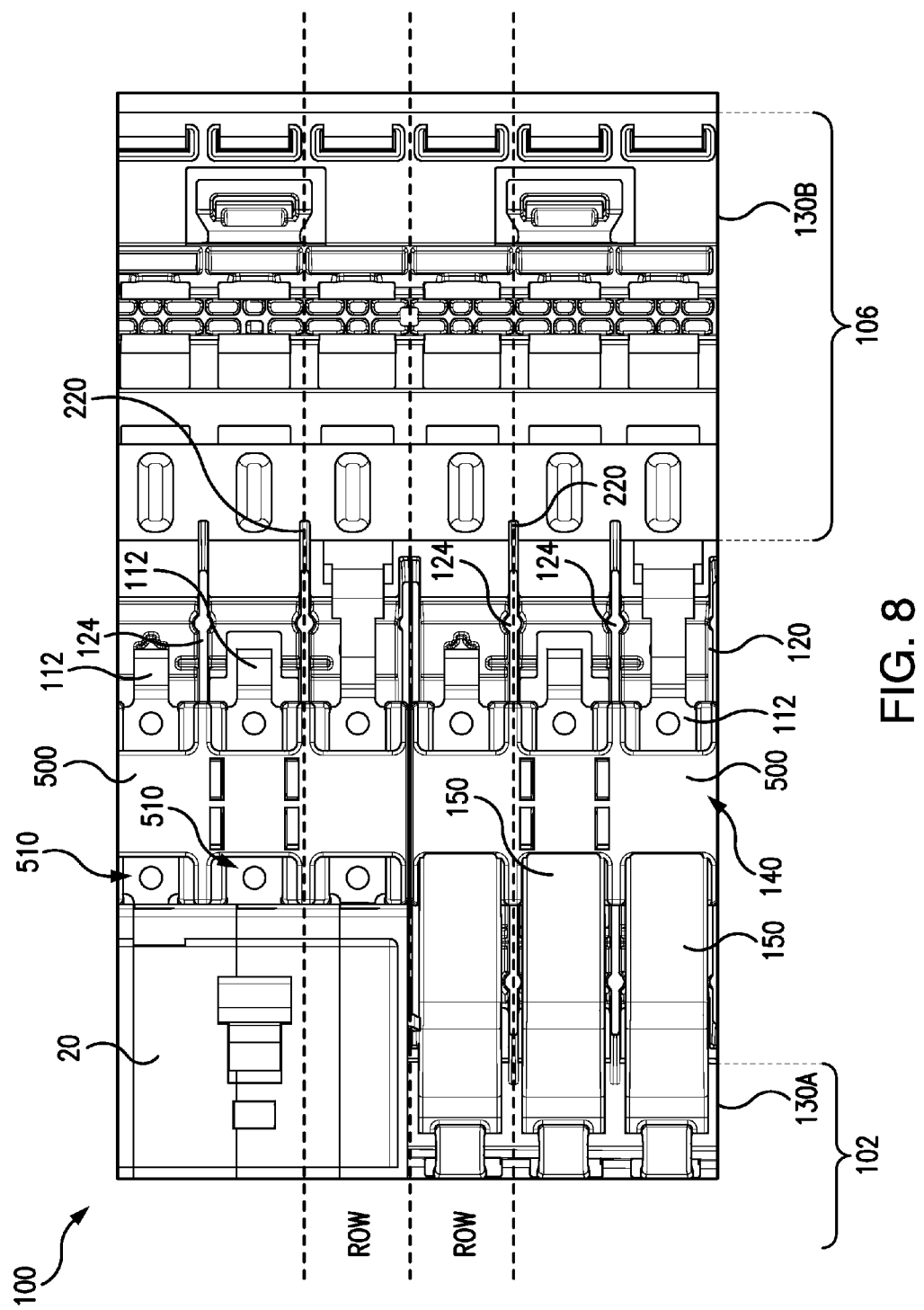
FIG. 8 illustrates a top or frontal view of a portion of the electrical panel of FIG. 1, with the top center cover connected to the phase barrier of the center bus cover along a center portion of the electrical panel and over the projections of the phase barrier.

FIG. 7 is a top perspective view of an enlarged portion of the electrical panel 100, and FIG. 8 is a top or frontal view of another enlarged portion of the electrical panel 100. As shown in FIGS. 7 and 8, the top center cover 140 is connected over a portion of the phase barrier 122 along the center portion 104 of the electrical panel 100. There is a clearance 700 (e.g., a space), shown in FIG. 7, which is provided between the top center cover 140 and the projections 124 of the phase barrier 122 to allow a terminal of a circuit breaker 20 to be engaged or disengaged from a branch connector(s) 112. As further shown in FIGS. 7 and 8, there is at least an access opening 510 and tab recess 512 associated with each location on the electrical panel 100 that can be occupied by a circuit breaker. In this example, the electrical panel 100 can have two circuit breakers 20 connected to a branch connector(s) 112 on each row, e.g., a terminal of one circuit breaker 20 from the first side portion 102 and a terminal from another circuit breaker 20 from the second side portion 104. When a circuit breaker 20, such as of the bolt-on type, is engaged onto and occupies one of the branch connectors 112, the associated access opening 510 allow access to its bolt-on terminal such as with properly sized tools. For example, as shown in FIG. 8, the access opening 510 is positioned over a bolt-on terminal of an occupying circuit breaker 20; however, the access opening 510 has a size and shape, which is finger safe and prevents an object having a diameter greater than 12 mm from directly contacting the terminal.

Figure 9:
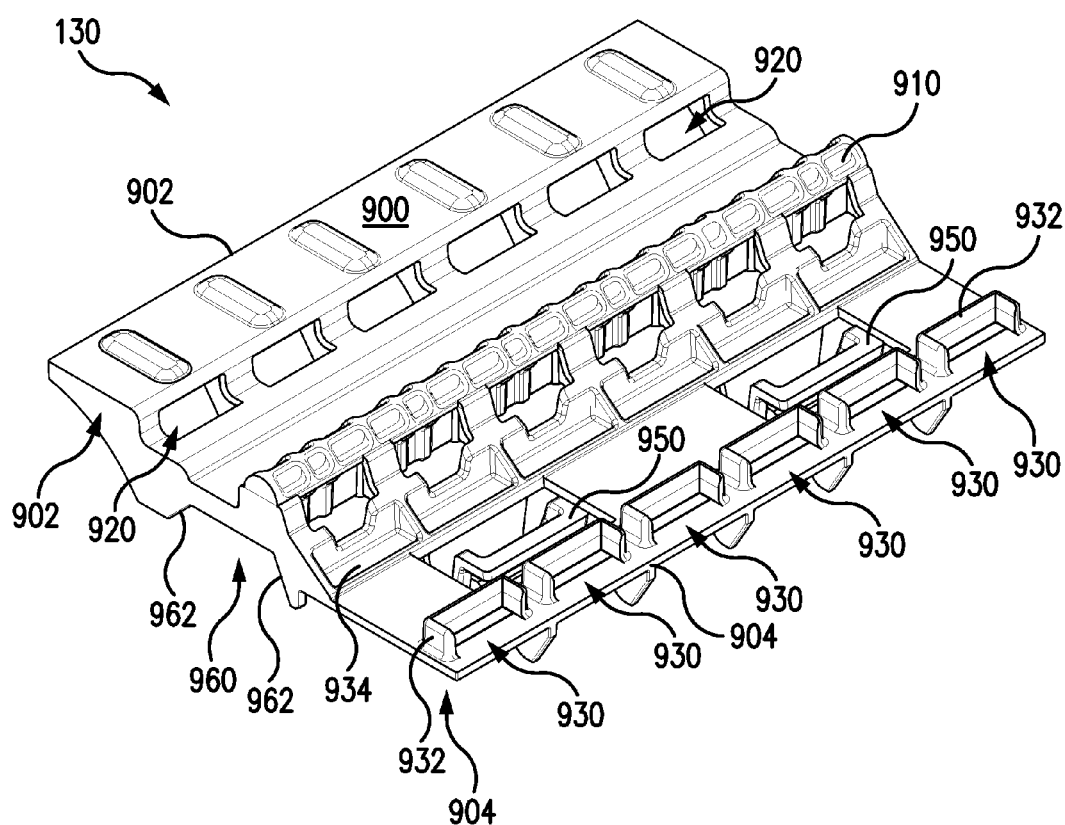
FIG. 9 illustrates a top perspective view of a section of a side bus cover of FIG. 1, with a rail to secure a circuit breaker and various slots to engage snap-in filler plate(s) and lug covers(s) for circuit breakers connected to the electrical panel, such as in FIG. 1.

FIG. 9 illustrates a top perspective view of a side bus cover section 900 of a side bus cover 130 (e.g., 130A or 130B of FIG. 1). A plurality of side bus cover sections 900 can be arranged back-to-back over and along each of the side portions 102 or 106 of the electrical panel 100, such as in FIG. 1. As shown in FIG. 9, the side bus cover section 900 includes a rail 910 on which to physically secure a circuit breaker (e.g., such as with a jaw on the circuit breaker), and one or more snap-fits 950 (e.g., a U-shaped cantilevered snap-fit). The snap-fits 950 are configured to snap into a recessed area (not shown), such as a recess or opening on the frame 10 or a base of the electrical panel 100 of FIG. 1 to connect the side bus cover section 900 thereto. The side bus cover section 900 also includes a channel 960 defined by walls 962 to cover energized components of the bus system thereunder (e.g., the bus bar of the first bus 110A (Phase A) or third bus 110C (Phase C)), and to isolate the energized components from other energized components of the bus system (e.g., the bus bar of the other buses such as the bus bar for Phase B).

The side bus cover section 900 further includes spaced-apart first slots 920, spaced-apart second slots 930, raised support rims 932 extending around a portion of each second slot 930, and recessed supports 934. The first slots 920 are situated along a first side 902 of the side bus cover section 900, and the second slots 930 are situated along a second side 904 opposite the first side 902. The first side 902 is elevated above the second side 904 on the side bus cover section 900. As will be discussed further below in greater detail, the first slots 920 are used to secure the snap-in filler plates 150 (e.g., in FIG. 1); the second slots 930, raised support rims 932 and recessed supports 934 are used to secure the lug covers 160 (e.g., in FIG. 1) over a portion of the circuit breakers 20.

Figure 10:
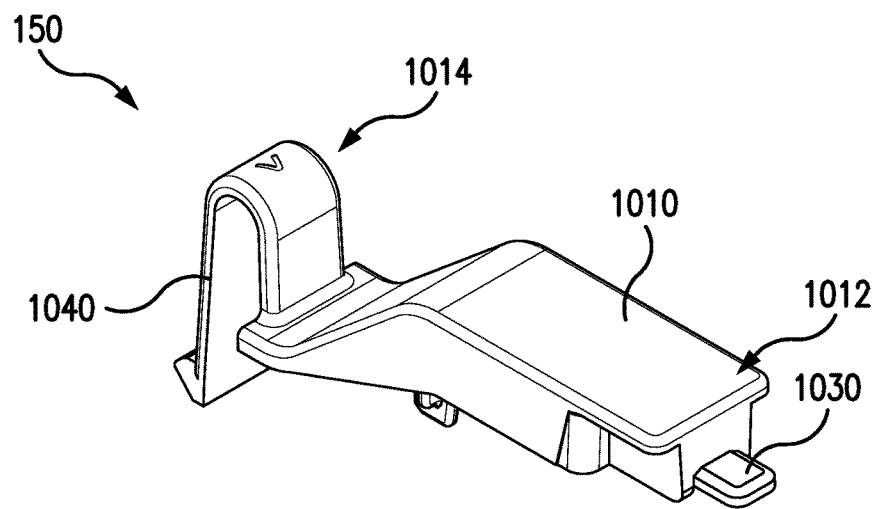
FIGS. 10 and 11 illustrate different top perspective views of the example snap-in filler plate shown in FIG. 1.
Figure 11:
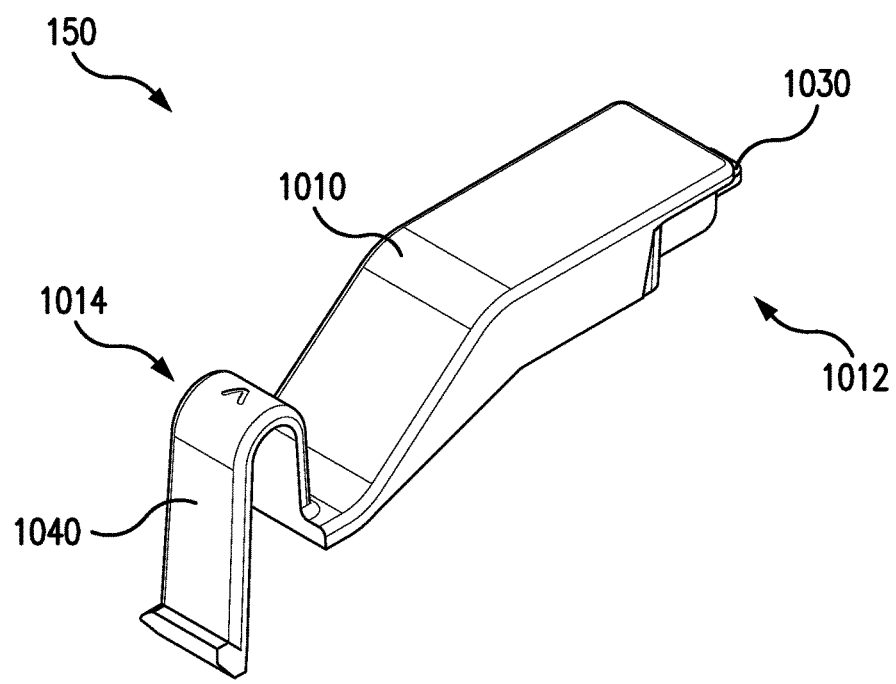
Figure 12:
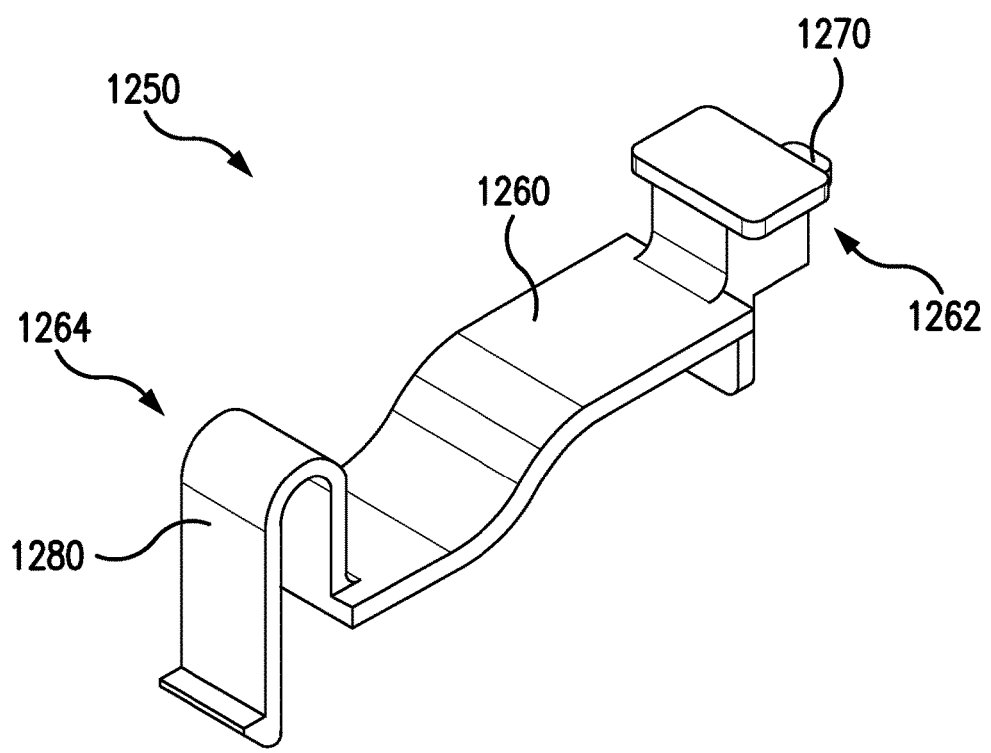
FIG. 12 illustrates a top perspective view of another example of a snap-in filler plate, which can be used with the electrical panel of FIG. 1.

FIGS. 10 and 11 show different top perspective views of the snap-in filler plate 150. The snap-in filler plate 150 includes a body 1010 having a first end 1012 and an opposite second end 1014. The first end 1012 includes a tab 1030. The second end 1014 includes a snap-fit 1040 (e.g., a U-shaped cantilevered snap-fit with an overhang on a free end). The snap-in filler plate 150 is provided as one example. Another example of a snap-in filler plate 1250 for use with the electrical panel 100 (in FIG. 1) is shown in FIG. 12 with a tab end elevated with reference to a central portion of its body. The snap-in filler plate 1250 includes a body 1260 with a first end 1262 and an opposite second end 1264. The first end 1262 includes a tab 1270, and the second end 1264 includes a snap-fit 1280 (e.g., a U-shaped cantilevered snap-fit with an overhang on the free end).

Figure 13:
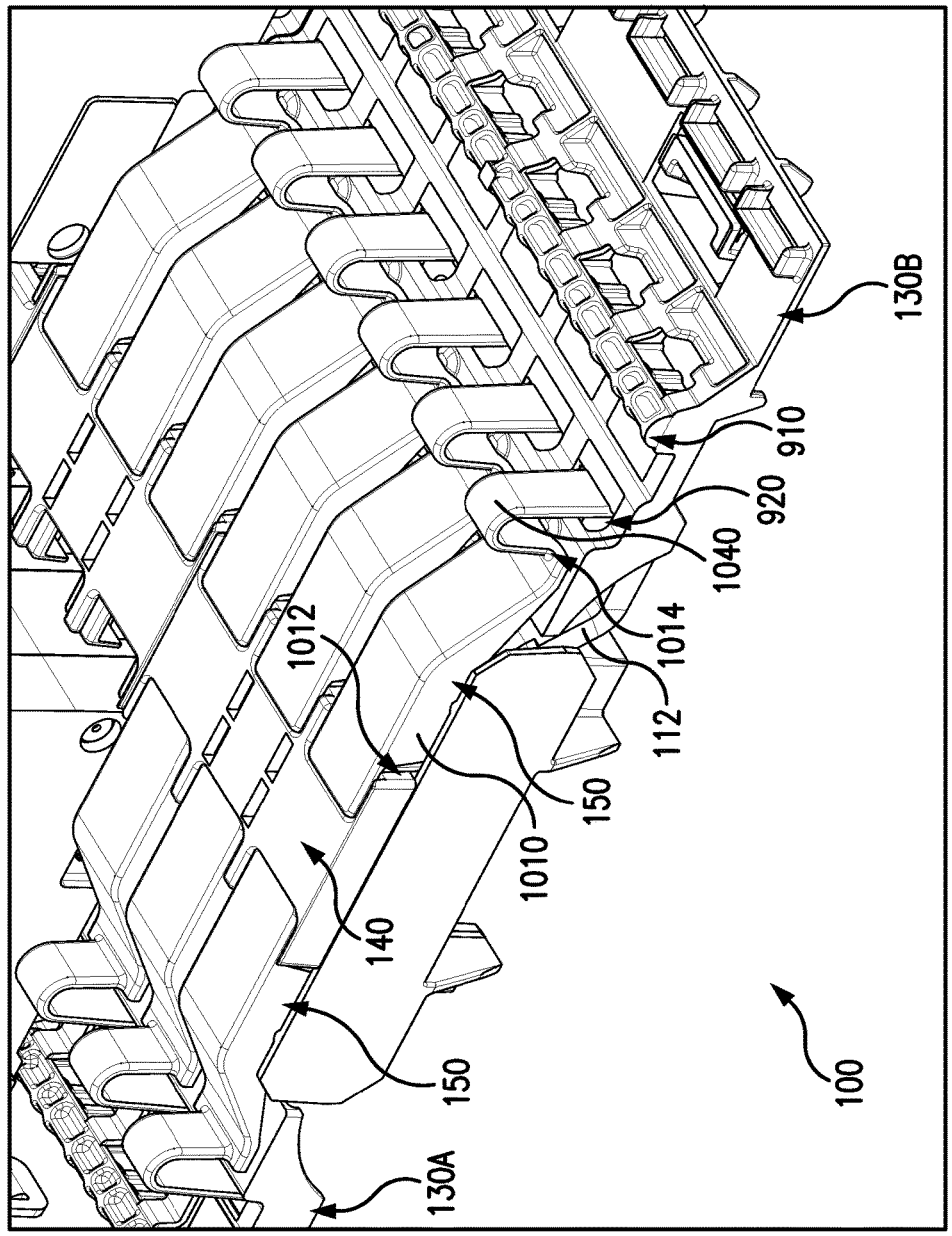
FIG. 13 illustrates a top perspective view of a portion of the electrical panel of FIG. 1, showing a plurality of snap-in filler plates engaged between the top center cover and one of the side bus covers.

FIG. 13 shows an enlarged portion of the electrical panel 100 of FIG. 1, with a plurality of snap-in filler plates 150 that are used to cover a portion of branch connectors 112 (between adjacent projections 124), which are not occupied by a circuit breaker. Each snap-in filler plate 150 is securable onto the electrical panel 100 by inserting the tab 1030 on the first end 1012 (see e.g., FIGS. 10-11) into the tab recess 512 of the top center cover 140 (see e.g., FIGS. 5 and 6), and then inserting the snap-fit 1040 on the second end 1014 into the first slot 920 of the side bus cover 130 (e.g., 130A or 130B). When secured onto the electrical panel 100, the snap-in filler plate 150 covers at least a portion of a branch connector 112 which is unoccupied by a circuit breaker 20 as well as an associated access opening 510 on the top center cover 140 (see e.g., FIGS. 5-7).

Figure 15:
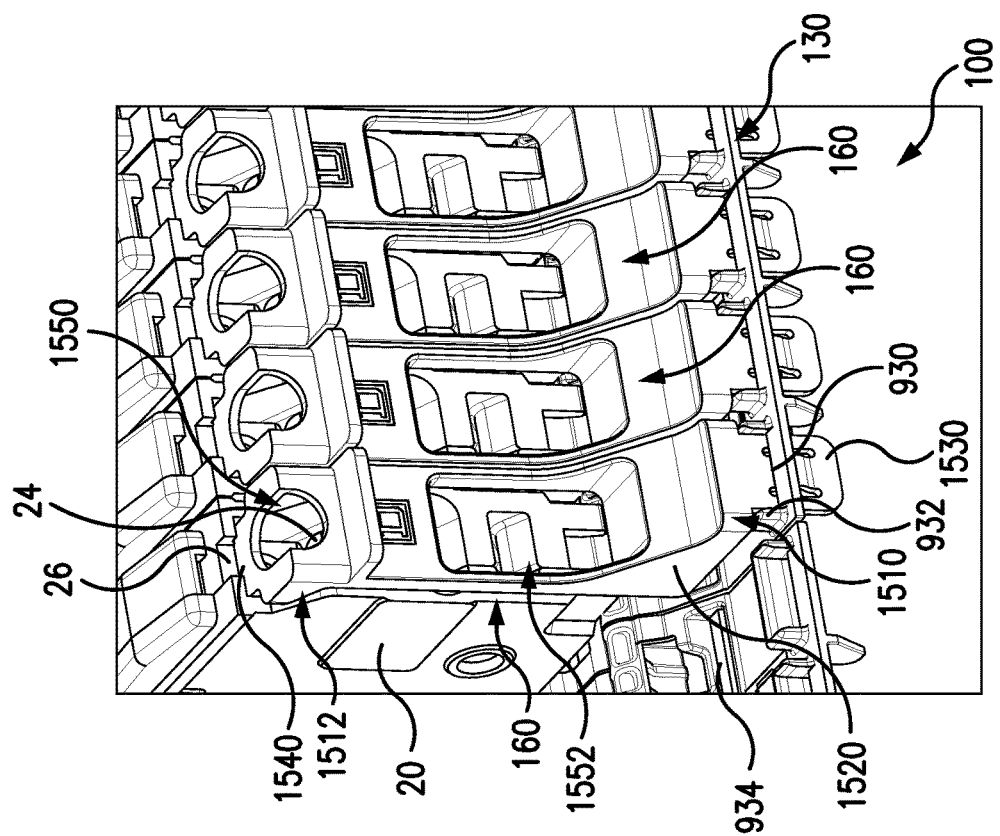
FIGS. 14 and 15 illustrate perspective views of a portion of the electrical panel of FIG. 1, showing circuit breakers on the electrical panel without a lug cover and with a lug cover respectively.
Figure 14:
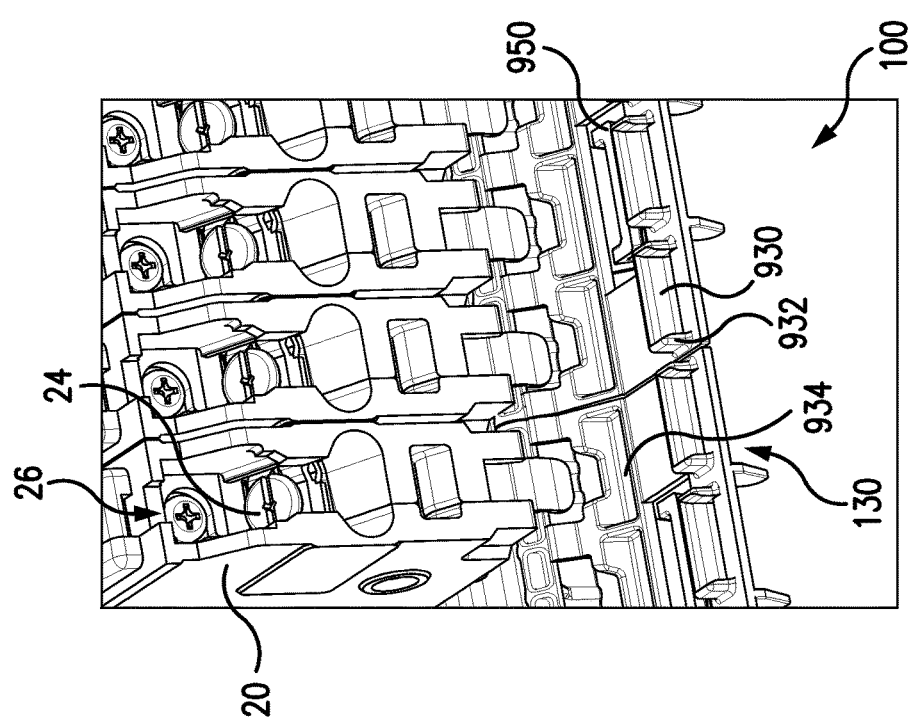

FIGS. 14 and 15 illustrate perspective views of an enlarged portion of the electrical panel 100 of FIG. 1, which shows a number of the circuit breakers 20 on the electrical panel 100 without and with the lug cover 160, respectively. As shown, the circuit breaker 20 includes a wire terminal 24 (e.g., a lug), which may be exposed, when the circuit breaker 20 is connected on the electrical panel 100. To prevent direct user contact of the wire terminal 24, the electrical panel 100 can employ a lug cover 160 for each circuit breaker 20. The lug cover 160 includes a first end 1510 and an opposite second end 1512. The first end 1510 of the lug cover 160 includes a base 1520 with a downward extending protrusion 1530. The second end 1512 of the lug cover 160 includes a transverse protrusion 1540, and a first opening 1550 to access a wire terminal of a circuit breaker. The lug cover 160 may also include a second opening 1552.

The lug cover 160 can be snapped onto and secured to the electrical panel 100 to cover the wire terminal 24 of a circuit breaker 20. For example, the downward extending protrusion 1530 on the first end of the lug cover 160 is inserted into and through one of the second slots 930 of one of the side bus covers 130, and the transverse protrusion 1540 is snapped into and engaged in a recessed portion 26 of the circuit breaker 20. When secured, the lug cover 160 also has a portion of the base 1520 seated or engaged in the recessed support 934. The openings 1550 and 1552 of the lug cover 160 are configured with a size and shape and at a location, which prevents access by an object having a diameter greater than 12 mm.

An example of the various components of an electrical panel with a touch safe system has been described above with reference to the figures. Each branch connector(s) between adjacent pairs of projections on the phase barrier can have associated therewith an assembly for a snap-in filler plate and for a lug cover in relation to each side portion (e.g., a left side and a right side) of the electrical panel. The size, shape, dimension and location of the various components or parts of these assemblies (e.g., slots, openings, recesses, recessed portions, recessed areas, protrusions, snap-fits, tabs, etc.) can be varied to satisfy safety requirements, or according to the size or type of the circuit breakers or the particular application. Although the various components of the electrical panel described herein can be secured using a snap-fit assembly (e.g., cantilever snap-fit(s), torsional snap-fit(s), etc.), they can also be connected together using other fasteners, such as bolts, tongue and groove, and so forth.

For example, the center bus cover along with the phase barrier can be connected to the center portion of a base or an end(s) of the electrical panel, the side bus covers can be connected to the base, end(s) or frame of the electrical panel along opposite side portions of the electrical panel, and the top center cover can be connected to the phase barrier (e.g., the projections of the phase barrier).

Words of degree, such as "about", "substantially", and the like are used herein in the sense of "at, or nearly at, when given the manufacturing, design, and material tolerances inherent in the stated circumstances" and are used to prevent the unscrupulous infringer from unfairly taking advantage of the invention disclosure where exact or absolute figures and operational or structural relationships are stated as an aid to understanding the invention. Furthermore, the terms "snap-in" or snap-on" (and their derivatives) are used interchangeably herein.

While particular embodiments and applications of the present disclosure have been illustrated and described, it is to be understood that the present disclosure is not limited to the precise construction and compositions disclosed herein and that various modifications, changes, and variations can be apparent from the foregoing descriptions.

The invention claimed is:

1. A touch safe system for an electrical panel with a bus system including a plurality of buses with branch connectors to distribute power to a plurality of branch circuits, the system comprising:
    a phase barrier arranged over and along a center portion of the electrical panel, the phase barrier having a plurality of spaced-apart projections to isolate the branch connectors from each other along the center portion of the electrical panel, each pair of adjacent projections with one of the branch connectors therebetween defining a row along which to connect a terminal of a circuit breaker to the one of the branch connectors;
    a side bus cover arranged adjacent to one side of the phase barrier and over and along a side portion of the electrical panel to prevent access by an object having a diameter greater than 12 mm to any energized component of the buses located thereunder on the side portion of the electrical panel, the side bus cover including:
        a plurality of spaced-apart first slots, each first slot being associated with a pair of adjacent projections with one of the branch circuits therebetween;
    a top center cover arranged over the phase barrier along the center portion of the electrical panel, the top center cover being connectable to the phase barrier; and
    a plurality of snap-in filler plates, each of the snap-in filler plates to cover an exposed portion of any one of the branch connectors between a pair of adjacent projections which is unoccupied by a circuit breaker, each of the snap-in filler plates having a first end and an opposite second end, the first end having a tab to interlock with the top center cover and a second end having a first snap-fit to engage one of the first slots of the side bus cover.

2. The system of claim 1, wherein the top center cover includes an access opening for each pair of adjacent projections, the access opening being coverable by one of the snap-in filler plates when an associated branch connector is unoccupied by a circuit breaker, the access opening being uncovered and having a size and shape to prevent access therethrough by an object having a diameter greater than 12 mm when the associated branch connector is occupied by the circuit breaker, the access opening being arranged over a bolt-on terminal of the occupying circuit breaker.

3. The system of claim 2, wherein the access openings are spaced-apart notches along an edge of one side of the top center cover in proximity to the side bus cover, the top center cover further including a tab recess associated with each access opening, the tab recess to receive a tab of one of the snap-in filler plates.

4. The system of claim 1, wherein the top center cover includes a downward extending second snap-fit to connect the top center cover to the phase barrier, the second snap-fit to snap into a recessed area on one of the projections or recessed areas on adjacent ones of the projections of the phase barrier.

5. The system of claim 4, wherein the top center cover includes a plurality of the downward extending second snap-fits, the top center cover being formed of a plurality of top center cover sections, each of the top center cover sections having spaced-apart access openings and one of the downward extending second snap-fits to snap into a recessed area of one of the projections or recessed areas on adjacent projections of the phase barrier.

6. The system of claim 1, further comprising a center bus cover including the phase barrier, the center bus cover arranged over and along a center portion of the electrical panel.

7. The system of claim 1, wherein the side bus cover has a side with an edge arranged below a portion of one of the projections of the phase barrier.

8. The system of claim 1, wherein the side bus cover further includes a second slot for each pair of adjacent projections with one of the branch connectors therebetween, the system further including a lug cover for a circuit breaker with a terminal electrically connectable to one of the branch connectors, the lug cover including a first end and an opposite second end, the first end of the lug cover to engage one of the second slots of the side bus cover, the second end of the lug cover to engage a portion of the circuit breaker.

9. The system of claim 8, wherein the first end of the lug cover includes a downward extending protrusion to engage and extend through one of the second slots of the side bus cover, and the second end of the lug cover includes a transverse protrusion to engage a recessed portion of the circuit breaker.

10. The system of claim 9, wherein the first end of the lug cover includes a base from which extends the downward protrusion, the base being seated in a recessed support on the side bus cover when the downward extending protrusion is engaged through one of the second slots of the side bus cover.

11. The system of claim 8, wherein the lug cover includes an opening for a wire terminal of a circuit breaker, the opening having a size and shape to prevent access by an object having a diameter greater than 12 mm.

12. The system of claim 8, wherein the side bus cover includes a raised support rim extending around a portion of each of the second slots.

13. The system of claim 1, comprising two of the side bus covers, the first of the two side bus covers to cover a first side portion on the electrical panel, the second of the two side bus covers to cover a second side portion of the electrical panel, the first and second side portions situated on opposite sides of the center portion of the electrical panel,
    wherein the pair of adjacent projections defines a row for two circuit breakers to be connected to one or more of the branch connectors therebetween, one of the two circuit breakers to be engaged from the first side portion of the electrical panel and the other of the two circuit breakers to be engaged from the second side portion of the electrical panel.

14. The system of claim 13, wherein each of the two side bus covers have a side with an edge arranged below a portion of one of the projections of the phase barrier.

15. The system of claim 13, wherein each of two side bus covers includes a second slot for each pair of adjacent projections with one of the branch connectors therebetween, the system further including a lug cover for a circuit breaker with a terminal electrically connectable to one of the branch connectors, the lug cover including a first end and an opposite second end, the first end of the lug cover to engage one of the second slots of the two side bus cover, the second end of the lug cover to engage a recessed portion of the circuit breaker.

\* \* \* \* \*